United States Patent [19]

Sundararaman et al.

[11] Patent Number: 6,159,549
[45] Date of Patent: Dec. 12, 2000

[54] FLEXIBLE PHOSPHATIZED POLYESTER-URETHANE PRIMERS AND IMPROVED COATING SYSTEMS INCLUDING THE SAME

[75] Inventors: Padmanabhan Sundararaman, Allison Park, Pa.; Jamel S. Richardson, Ann Arbor, Mich.; Robert A. Montague; Trang D. Tran, both of Allison Park, Pa.

[73] Assignee: PPG Industries Ohio, Inc., Cleveland, Ohio

[21] Appl. No.: 09/213,605

[22] Filed: Dec. 17, 1998

Related U.S. Application Data

[60] Provisional application No. 60/069,912, Dec. 17, 1997.
[51] Int. Cl.$^7$ ........................................................ B05D 1/36
[52] U.S. Cl. .................................................. 427/410
[58] Field of Search .................................. 427/407.1, 410

[56] References Cited

U.S. PATENT DOCUMENTS

| | | | |
|---|---|---|---|
| 4,450,257 | 5/1984 | Behmel et al. | 525/437 |
| 4,507,447 | 3/1985 | Yamazaki et al. | 525/428 |
| 4,692,382 | 9/1987 | Schmitt et al. | 428/414 |
| 4,720,405 | 1/1988 | Carson et al. | 427/410 |
| 4,835,018 | 5/1989 | Higginbotham et al. | 427/380 |
| 5,242,751 | 9/1993 | Hartman | 428/324 |
| 5,688,598 | 11/1997 | Keck et al. | 428/458 |
| 5,859,154 | 1/1999 | Temple et al. | 525/509 |

FOREIGN PATENT DOCUMENTS

A-37162/89  4/1990  Austria .

OTHER PUBLICATIONS

Derwent Abstract 95–094031 of Japanese Patent Document J 07018219, Jan. 20, 1995.
Uncertified Translation of DE 35 32 865 A1, Apr. 4, 1987.

*Primary Examiner*—Erma Cameron
*Attorney, Agent, or Firm*—Paul S. Chirgott; Deborah Altman

[57] ABSTRACT

The invention provides a novel coating composition which includes: (a) a polyester-based resin component, (b) an epoxy component, (c) a crosslinker component, (d) a catalyst component, and (e) a diluent component. The polyester-based resin component includes at least one phosphatized polyester resin; and the epoxy component includes at least one phosphatized epoxy resin. These coating compositions are particularly suitable as primers, and especially as primers for use used in conjunction with coating composition which include fluorocarbon polymers. Also provided is a method of providing a substrate with a multilayer coating system. This method includes: (a) applying at least one layer of the aforementioned novel primer onto a substrate; and (b) applying at least one layer of a second coating composition over the primed substrate of step (a). When this method employs the use of a second coating composition which includes fluorocarbon polymers, the results is multi-layered coated substrate which, while having excellent weatherability properties, also has excellent formability properties.

20 Claims, No Drawings

FLEXIBLE PHOSPHATIZED POLYESTER-URETHANE PRIMERS AND IMPROVED COATING SYSTEMS INCLUDING THE SAME

This application claims the benefit of U.S. Provisional Application No. 60/069,912, filed Dec. 17, 1997.

FIELD OF THE INVENTION

The present invention pertains to novel polyester-urethane primers, as well as processes for making and using the same. The present invention further pertains to novel coating systems which include the use of such primers.

BACKGROUND OF THE INVENTION

In the production of coating compositions for, among other things, structural building components such as metal building panels, there are often competing goals to be reconciled. On the one hand, there is the need for good durability properties such as color retention, mar resistance and chalk resistance in the face of severe weather conditions, as well as corrosive industrial pollutants. On the other hand, there is the requirement of good flexibility to facilitate fabrication of the metal without loss of the coating's adhesion.

In the coil coating industry, these difficulties are exemplified by the conventionally utilized plastisol-based coating compositions. Plastisols are desirable coating vehicles in the coil coating industry from the standpoint of fabrication. However, they impart undesirable properties such as poor durability, color retention, chalk resistance and dirt resistance. As a result, compromises must often be made either in terms of ultimate film properties or workability of the coated substrate.

As can be seen from the above, there is a need in the coating industry for a coating system which provides a protective film that not only is durable, but also does not adversely affect the coated substrate's workability and/or ease of fabrication.

SUMMARY OF THE INVENTION

In accordance with the present invention, there is provided a novel coating composition which includes: (a) a polyester-based resin component, (b) an epoxy component, (c) a crosslinker component, (d) a catalyst component, and (e) a diluent component. The coating compositions of the present invention are particularly suitable as primers, and especially for primers used in conjunction with coating compositions which include fluorocarbon polymers.

Also provided in accordance with the present invention is a method of providing a substrate with a multilayer coating system. This method includes:

(a) applying at least one layer of the novel primer onto a substrate; and (b) applying at least one layer of a coating composition over the coated substrate of step (a).

When this method employs the use of a coating composition which includes fluorocarbon polymers, the results is multi-layered coated substrate which, while having excellent weatherability properties, also has excellent formability properties.

DETAILED DESCRIPTION OF THE INVENTION

One embodiment of this invention provides a novel coating composition which is particularly useful as a primer.

Another embodiment of this invention provides a method of making a multi-layered coated substrate which includes a coating system employing the aforementioned novel primer.

The novel coating composition of the present invention includes: (a) a polyester-based resin component, (b) an epoxy component, (c) a crosslinker component, (d) a catalyst component, and (e) a diluent component. This novel coating composition has a solids concentration which is greater than about 20 weight percent. Typically, the coating composition's solids concentration ranges from about 20 to about 80 weight percent, more typically, from about 30 to about 70 weight percent, and even more typically, from about 40 to 60 weight percent. These weight percentages are based upon the total weight of the resulting coating composition.

The polyester-based resin component of coating compositions prepared in accordance with this invention is present in amount greater than about 30 weight percent. Typically, this component is present in an amount ranging from about 30 to about 90 weight percent, more typically, from about 40 to about 80 weight percent, and even more typically, from about 50 to about 70 weight percent. These weight percentages are based on the total weight of the resin solids in the resulting coating composition.

The polyester-based resin component includes at least one phosphatized polyester resin. It is important when practicing this invention that, if a single the phosphatized polyester resin is employed, it has a number-average molecular weight ($M_n$) ranging within a particular range. Specifically, if the polyester resin's $M_n$ is too large, the resulting coating would be too soft. On the other hand, if the polyester resin's $M_n$ is too low, the resulting coating would be too hard. Typically, when a single polyester resin is employed, it has an $M_n$ ranging from about 1,000 to about 20,000, more typically, from about 2,000 to about 10,000, and even more typically from about 3,000 to about 5,000. Unless otherwise stated, number-average molecular weight's reported herein are those as measured by the gel permeation chromatography (GPC) method, using the calibration curve of polystyrene standards.

However, if a blend of at least two phosphatized polyester resins are employed, one is typically in a low molecular weight range which imparts hardness to the coating, while the other is typically in a high molecular weight range which imparts flexibility to the coating. In such a scenario, the $M_n$ of the polyester resin in the low range is typically from about 500 to about 5,000; more typically, from about 1,000 to about 4,500; and more typically, from about 1,500 to 4,000. On the other hand, the $M_n$ of the polyester resin in the high range is typically from about 5,000 to about 30,000; more typically, from about 8,000 to about 25,000; and more typically, from about 10,000 to about 20,000.

The phosphatized polyester resin employed when practicing this invention can be made by any suitable means which will be known to those skilled in the art after reading this specification. One example of such suitable means includes phosphatizing a polyester resin which was made by reacting at least one polybasic acid with at least one polyhydric alcohol.

Many polybasic acids and polyhydric alcohols may be used to prepare such polyester resins. However, those polybasic acids which are particularly useful include at least one of the following: terephthalic acid, isophthalic acid, phthalic anhydride, adipic acid, succinic acid, azelaic acid, sebacic acid, maleic acid, fumaric acid, cyclohexane dicarboxylic acids and anhydrides or esters thereof, and the like. On the other hand, those polyhydric alcohols which are particularly useful include at least one of the following: ethylene glycol, neopentyl glycol, substituted propane diols, substituted butane diols, substituted pentane diols, substituted hexane diols, cyclohexane dimethanol, diethylene glycol and triols (e.g., trimethylolpropane), and the like.

Besides polyesters formed from a reaction between polybasic acids and polyhydric alcohols, polylactone-type polyesters can also be employed. These polyesters are formed from the reaction of a lactone (e.g., epsilon-caprolactone) and a polyhydric alcohol. The reaction product of a lactone with an acid-containing polyhydric alcohol can also be employed.

The resulting polyester resin is then phosphatized by any suitable means which will be known to those skilled in the art after reading this specification. Examples of such suitable means includes reacting the polyester resin with phosphoric acid and/or super phosphoric acid.

The epoxy component of coating compositions prepared in accordance with this invention is present in amount less than about 25 weight percent. Typically, this component is present in an amount ranging from about 1 to about 25 weight percent, more typically, from about 3 to about 20 weight percent, and even more typically, from about 5 to about 15 weight percent. These weight percentages are based on the total weight of the resin solids in the resulting coating composition.

The epoxy component includes at least one phosphatized epoxy resin. This phosphatized epoxy resin has an $M_n$ ranging from about 100 to about 10,000. Typically, the phosphatized epoxy resin has an $M_n$ ranging from about 250 to about 7,500; and more typically, from about 500 to about 5,000.

The phosphatized epoxy resin employed when practicing this invention can be made by any suitable means which will be known to those skilled in the art after reading this specification. One example of such suitable means includes phosphatizing an epoxy resin which has an epoxy equivalent weight ranging from about 50 to about 5,000. Typically, the epoxy being phosphatized has an equivalent weight ranging from about 75 to about 3,000; and more typically, from about 100 to about 1,000.

The epoxy being phosphatized can be any suitable aromatic or cycloaliphatic epoxy resin which will be known to those skilled in the art after reading this specification. Examples of a suitable aromatic epoxy resin are bisphenol A-type epoxy resins, such as EPON® 828 epoxy resin and EPON® 880 epoxy resin, both of which are commercially available from Shell Oil and Chemical Co. On the other hand, examples of a suitable cycloaliphatic epoxy resins are fully hydrogenated bisphenol A-glycidyl ethers, and glycidyl ethers or esters of aliphatic diols or polyols resins, such as EPONEX® 1510 epoxy resin and HELOXY® 505 epoxy resin, both commercially available from Shell Oil and Chemical Co. In one preferred embodiment, the epoxy resin which is phosphatized is EPONEX® 1510 epoxy resin.

The epoxy resin can be phosphatized by any suitable means which will be known to those skilled in the art after reading this specification. Examples of such suitable means include reacting the epoxy resin with phosphoric acid and/or super phosphoric acid.

The crosslinker component of coating compositions prepared in accordance with this invention is present in amount less than about 45 weight percent. Typically, this component is present in an amount ranging from about 5 to about 45 weight percent, more typically, from about 10 to about 35 weight percent, and even more typically, from about 15 to about 25 weight percent. These weight percentages are based on the total weight of the resin solids in the resulting coating composition.

The crosslinker component includes at least one polyisocyanate. Typically, the polyisocyanate employed is blocked. Any suitable polyisocyanate can be used when practicing this invention. Examples of suitable polyisocyanates include at least one of the following: isocyanurates precursors (e.g., hexamethylene diisocyanate) and isophorone diisocyanate with various blocking agents (e.g., e-caprolactam, 2-butanone oxime, and malonicacid-diethylester). In one preferred embodiment, the polyisocyanate employed is the isocyanurate of hexamethylene diisocyanate blocked with 2-butanone oxime.

The catalyst component of coating compositions prepared in accordance with this invention is present in amount less than about 15 weight percent. Typically, this component is present in an amount ranging from about 0.1 to about 15 weight percent, more typically from about 0.5 to about 10 weight percent, and even more typically, from about 1 to about 5 weight percent. These weight percentages are based on the total weight of the resin solids in the resulting coating composition.

The catalyst component includes any suitable catalyst which can initiate and/or perpetuate a reaction between at least two of the coating composition's following components: the polyester-based resin component, the crosslinker component and the epoxy component. Examples of such a suitable catalyst includes: tin-based catalyst (e.g., dibutyltindilaurate or dibutyltindiacetate), amines, organometallics, and other metal catalysts In one preferred embodiment, the catalyst employed includes dibutyltindilaurate.

The diluent component of coating compositions prepared in accordance with this invention is present in amount less than about 80 weight percent. Typically, this component is present in an amount ranging from about 80 to about 20 weight percent, more typically, from about 70 to about 30 weight percent, and even more typically, from about 60 to about 40 weight percent. These weight percentages are based on the total weight of the resulting coating composition.

The diluent component includes any suitable diluent which can be used with the other particular components of the coating compositions. Suitable diluents will be readily apparent to those skilled in the art after reading this specification. Examples of such suitable diluents include: aromatic petroleum distillates (e.g., cyclohexane), methyl ethyl ketone, methyl isobutyl ketone, alcohols (e.g., ethyl alcohol, propyl alcohol and diacetone alcohol), dimethyl phthalate, mono- and dialkyl ethers of ethylene and diethylene glycol (e.g., ethylene glycol monoethyl ether, ethylene glycol monobutyl ether, ethylene glycol monoethyl ether acetate, diethylene glycol monobutyl ether and diethylene glycol diethyl ether), and the like..

In addition to the above, coating compositions prepared in accordance with this invention can include a number of different optional components. After reading this specification, skilled artisan would readily know which, if any optional components are necessary for a particular end use and, if necessary, in what concentration. If optional components are present, they are typically employed in an amount ranging from about 1 to about 50 weight percent, more typically, from about 5 to about 40 weight percent, and more typically, from about 10 to about 30 weight percent. These weight percentages are based upon the total weight of the resulting coating composition.

Examples of some optional components which may be added to coating compositions prepared in accordance with the present invention include: a pigment component (e.g., chrome-containing pigments and filler pigments), an anti-settling agent component, a light stabilizer agent component, and a flow control agent component.

If a pigment component is present, it preferably includes at least one chrome-containing pigment. Examples of chrome-containing pigments include: strontium chromate, zinc potassium chromate, zinc chromate, and the like. In one preferred embodiment, if a pigment component is employed, it includes strontium chromate by itself, or blend of strontium chromate with zinc chromate and/or zinc potassium chromate If employed in the pigment component, chrome-containing pigments are typically included in an amount ranging from about 20 to about 100 weight percent, more typically, from about 30 to about 80 weight percent, and even more typically, from about 40 to about 60 weight percent. These weight percentage are based upon the total weight of the pigment solids present in the resulting coating composition.

Other pigments that can be part of an optional pigment component are filler pigments such as titanium dioxide, silicas, clays, calcium carbonate, and the like. If employed in the pigment component, filler pigments are typically included in an amount ranging from about 10 to about 80 weight percent, more typically, from about 20 to about 70 weight percent, and even more typically, from about 30 to about 60 weight percent. These weight percentage are based upon the total weight of the pigment solids present in the resulting coating composition.

If a pigment component is employed, the coating composition typically also includes an anti-settling agent component. If the latter is employed, it can include any suitable anti-settling agents which will be known to those skilled in the art after reading this specification. Examples of such suitable anti-settling agents which can be used include: clays (e.g., BENTONE 34 clay and BENTONE 38 clay, commercially available from Rheox, Inc.), and silicas (e.g., AEROSIL 200 silica, commercially available from Degussa Corporation), and the like.

If employed, anti-settling agents are typically included in an amount ranging from about 1 to about 15 weight percent, more typically, from about 2 to about 10 weight percent, and even more typically from about 3 to about 5 weight percent. These weight percentage are based upon the total weight of the pigment solids, if any, present in the resulting coating composition.

The coating composition of the present invention can be applied to substrates by any suitable means which will be known to those skilled in the art after reading this specification. Examples of such suitable application means include: coil coating, spraying, flow coating, spin coating, curtain coating and dip coating. Notwithstanding the above, the coating compositions of this invention are especially suitable for application onto substrates by coil coating techniques.

These present coating compositions can be applied onto a number of different substrates. Then, once the coating is applied over the substrate, it can be cured thermally by any suitable means known to those skilled in the art. Examples of such suitable curing techniques include: baking in a thermal oven, induction heating, infrared heating, and the like, and/or combinations thereof.

A very important aspect of the aforedescribed coating composition is its flexibility. For example, coating compositions prepared in accordance with the present invention typically have an elongation of at least about 10 percent. Depending upon the selection of components, the coating can have an elongation which is at least about 20 percent. The elongation reported herein can be determined with an INSTRON Tester according to ASTM D638-72.

The flexibility coating compositions prepared in accordance with this invention is particularly advantageous when the coatings are used as primers in forming a substrate with a multilayer coating system. Specifically, the flexibility of the primer contributes greatly to the flexibility of the multi-coat system. This is especially useful in the coil coating industry due to the obvious advantage of coating the flat coils of substrate first and then fabricating the coated substrate into desired objects.

The present invention also provides a method of making a substrate with a multilayer coating system and coated substrates produced by the method. The method includes at least a first step of applying the novel primer coating composition of this invention onto a substrate and a second step of applying a pigmented coating composition over the primed substrate.

While this process is suitable for coating a wide variety of substrates, it is especially suitable for coating metal, particularly,. coiled metal stock. Examples of metal substrates overwhich the aforementioned primer can be applied are steel and aluminum, specific examples of which include: cold-rolled steel, hot dip galvanized steel, aluminized steel, and steels clad with zinc/aluminum alloys.

Once the primer coating composition has been applied to the substrate, a coating composition is typically applied thereover. This coating composition can be applied over the primer coating wet-on-wet (i.e., the coated substrate can be subsequently coated without first being dried). Alternatively, the primer can be at least partially cured prior to the application of the pigmented coat.

If excellent weatherability is desired, the coating composition typically includes a fluorocarbon polymer. Several different fluorocarbon polymers-containing coating compositions can be used when practicing this embodiment of the invention. Examples of such are coatings which include: polyvinyl fluorides, polyvinylidene fluorides, vinyl fluoride copolymers, and vinylidene fluoride copolymers. The preferred fluorocarbon polymer is polyvinylidene fluoride. Specific examples of fluoropolymer-containing pigmented coatings which can be employed include those disclosed in U.S. Pat. Nos. 4,720,405 and 4,692,382.

Once the coating composition has been applied over the primed substrate, it can be cured to form the multi-layered coated substrate of the present invention. The multilayer coated substrate of the present invention demonstrates not only superior fabricability, but also superior adhesion of the primer to the substrate, as well as superior intercoat adhesion between the various layers of coatings. This imparts on the final coated substrate, excellent abrasion resistance, excellent mar resistance, and excellent resistance to weathering and industrial pollutants.

In addition to the above, if the coating applied over the primed substrate is pigmented, it is within the scope of this invention to apply a clear coating composition over that pigmented layer. Depending upon the clear coating selected, it can contribute greatly to the appearance, abrasion resistance, mar resistance, and weatherability of the final coated substrate. If a clear coating is employed, it can also be applied either wet-on-wet or wet-on-dry.

Any suitable clear topcoat can be employed. Examples of such include: fluorocarbon-containing topcoats (e.g., DURANAR® coating), polyester containing topcoats (e.g., ZT and ZTII coating), waterborne acrylic containing topcoats (e.g., ENVIRON® coating) and solvent-borne acrylic-containing topcoats (e.g., DURACRON® coating). However, if added levels of durability are desired, the clear coating composition employed in this optional step also preferably includes a fluorocarbon polymer. The fluorocarbon polymers which are preferably included in the optional clear coating include those described above in connection with the fluorocarbon polymer-containing pigmented coating.

The dry film thickness of the primer coating composition typically ranges from about 0.1 mil to about 4 mils, more typically, from about 0.3 mil to about 3 mils, and even more typically, from about 0.5 mil to about 2 mils. The dry film thickness of the coating composition applied over the primed substrate also typically ranges from about 0.1 mil to about 4 mils, more typically, from about 0.3 mil to about 3 mils, and even more typically, from about 0.5 mil to about 2 mils. However, if a clear topcoat is applied over a pigmented intermediate layer, it typically has a dry film thickness which ranges from about 0.01 mil to about 3 mils, more typically, from about 0.05 mil to about 2 mils, and even more typically, from about 0.1 mil to about mil.

EXAMPLES

The present invention is more particularly described in the following examples which are intended as illustration only and are not intended to limit the scope thereof.

Example 1
Preparation of a Phosphatized Polyester Resin

This examples illustrates the making a polyester-based resin component which can be used when practicing the invention. This polyester-based resin component includes a phosphatized polyester resin.

A polyester resin was prepared by mixing together the following monomers: neopentyl glycol (16 weight percent), propylene glycol (5 weight percent), trimethylolpropane (1 weight percent), dodecanedioic acid (13 weight percent), phthalic anhydride (24 weight percent), isophthalic acid (27 weight percent), 2-methylpropane diol ( 16 weight percent), butyl stanoic acid (0.1 weight percent), and triphenyl phosphite (0 .1 weight percent). This mixture was esterified under nitrogen atmosphere over a period of about 12 hours at a temperature of ranging from 180° C. to 240° C.

When the acid value of the mixture dropped to about 25, a small amount of AROMATIC 100 solvent (i.e. an aromatic hydrocarbon solvent blend commercially available from Exxon) was incorporated for azeotropic distillation of water evolved as a condensate by-product. Then, when the acid value of the mixture dropped to about 15, the mixture was cooled to about 160° C. Thereafter, phosphoric acid (85% solution in water, 0.8 wt. percent) was added and the azeotropic distillation of water was continued until acid value of the mixture dropped to below 12.0. The resulting phosphatized polyester resin was then dissolved in a solvent blend of 75/25 AROMATIC 100 solvent and DOWANOL PM acetate (a propylene glycol methyl ether, commercially available from Dow Chemical Co.) to produce a composition which was about 60% weight solids.

The number average molecular weight of the resulting phosphatized polyester was about 4,000; its acid value was about 7; and its hydroxyl value about 13. The resin's number average molecular weight was measured by GPC using the calibration curve of polystyrene standards.

Example 2
Preparation of Phosphatized Epoxy Resins

This examples illustrates the making an epoxy component which can be used when practicing the invention. This epoxy component includes phosphatized epoxy resins.

A first phosphatized epoxy resin was prepared by dissolving 90 weight percent of EPONEX 1510 epoxy resin (a cycloaliphatic epoxy resin from Shell Oil and Chemical Co. having an epoxy equivalent weight of about 235) in butyl CELLOSOLVE acetate (2-butoxyethyl ester of acetic acid, commercially available from Union Carbide Chemicals and Plastics Co., Inc.). Thereafter, 10 weight percent of phosphoric acid was added. The blend was agitated for about 1.5 hours, at a temperature of about 115° C., under nitrogen atmosphere to form a phosphatized epoxy resin. Then, the resulting resin was further diluted with butyl CELLOSOLVE acetate to produce a composition which was about 55 percent weight solids.

A second phosphatized epoxy resin was prepared by dissolving 90 weight percent of EPON 828 epoxy resin (a polyglycidyl ether of bisphenol A, commercially available from Shell Oil and Chemical Co.) in butyl CELLOSOLVE acetate. Thereafter, 10 weight percent of phosphoric acid was added. The blend was agitated for about 1.5 hours, at a temperature of about 115° C., under nitrogen atmosphere to form a phosphatized epoxy resin. Then, the resulting resin was further diluted with butyl CELLOSOLVE acetate to produce a composition which was about 55 percent weight solids.

Example 3
Preparation of a Clear Primer

This examples illustrates the preparation of a clear primer coating composition. This primer includes the phosphatized polyester resin from Example 1 as its polyester-based resin component.

A primer was prepared by mixing together the following components: 83 weight percent of the phosphatized polyester resin from Example 1 was combined with 15 weight percent of DESMODUR BL 3175A crosslinking agent (a blocked isocyanate crosslinking agent commercially available from Bayer Corporation), and 2 weight percent of FASCAT 4202 catalyst (a dibutyltin dilaurate catalyst commercially available from ATOCHEM). These weight percentages were based upon the total weight, in grams, of the resin solids in the resulting primer.

After these components were mixed together, the blend was diluted with 25 grams of ethylene glycol monobutylether. Hereinafter, the resulting primer is referred to as Primer C. The total solids concentration of Primer C was about 45 weight percent.

Example 4
Preparation of a Pigmented Primer

This examples illustrates the preparation of a pigmented primer coating composition. This primer includes the phosphatized polyester resin from Example I as its polyester-based resin component.

A primer was prepared by mixing together the same components of Example 3 in the same concentrations with the following exception: after the components were combined together, the blend was diluted with 64 grams or AROMATIC 100 solvent and 25 grams of dibasic ester. To this diluted mixture, about 80 grams of a pigment blend including 29 grams of strontium chromate, 10 grams of zinc potassium chromate, 40 grams of titanium dioxide, and 1 gram of anti-settling agent were added. Hereinafter, the resulting primer is referred to as Primer P. The total solids concentration of Primer P was about 55 weight percent.

Example 5
Preparation of a Pigmented Primer with a Phosphatized Aromatic Epoxy Resin This examples illustrates the preparation of a pigmented primer coating composition. This primer includes Primer P from Example 4 and the aromatic phosphatized epoxy resin from Example 2 as the epoxy component, wherein EPON 828 epoxy resin was phosphatized.

About 5 weight percent of this phosphatized EPON 828 epoxy resin from Example 2 was added to Primer P. Hereinafter, the resulting primer is referred to as Primer P/AE. The total solids concentration of Primer P/AE was about 55 weight percent.

Example 6
Preparation of a Pigmented Primer with a Phosphatized Cycloaliphatic Epoxy Resin This examples illustrates the preparation of a pigmented primer coating composition. This primer includes Primer P from Example 4 and the cycloalaphatic phosphatized epoxy resin from Example 2 as the epoxy component, wherein EPONEX 1510 epoxy resin was phosphatized.

About 5 weight percent of the phosphatized EPONEX 1510 epoxy resin from Example 2 was added to Primer P. Hereinafter, the resulting primer is referred to as Primer P/CE. The total solids concentration of Primer P/CE was about 55 weight percent.

Example 7
Preparation of a Pigmented Primer with a Super-Phosphatized Cycloaliphatic Epoxy This examples illustrates the preparation of a pigmented primer coating composition. This primer includes Primer P from Example 4 and the cycloalaphatic phosphatized epoxy resin from Example 2 as the epoxy component, wherein EPONEX 1510 epoxy resin was phosphatized, with the exception that superphosphoric acid was used to phosphatize the epoxy resin.

This primer was prepared in essentially the same manner as that in Example 6 except that the EPONEX 1510 epoxy resin was phosphatized with superphosphoric acid. Hereinafter, the resulting primer is referred to as Primer P/SCE. The total solids concentration of Primer P/SCE was about 55 weight percent.

Example 8
Preparation of a Clear Topcoat

This examples illustrates the preparation of a clear topcoat coating composition. This topcoat was part of a coating system applied over the primers prepared in Examples 3–7.

The clear topcoat was made by blending 30 weight percent of a blend of acrylic resins, with 70 weight percent of a polyvinylidene fluoride polymer (KYNAR® 500 polyvinylidene fluoride polymer commercially available from ATOCHEM). These weight percentages were based upon the total weight, in grams, of the resin solids in the clear topcoat.

After these components were combined, the blend was diluted with 90 grams of isophorone. To this diluted mixture, about 5 grams of conventional additives (e.g., flatting and flow control agents) were added. Hereinafter, the resulting topcoat is referred to as Topcoat C. The total solids concentration of Topcoat C was about 47 weight percent.

Example 9
Preparation of a Pigmented Topcoat

This examples illustrates the preparation of a pigmented topcoat coating composition. This topcoat was part of a coating system applied over the primers prepared in Examples 3–7.

The pigmented topcoat was made by blending 85 weight percent of a blend of the polyester resins with 11 weight percent of a melamine formaldehyde, and 0.2 weight percent of a 40 percent solution of paratoluene sulfonic acid in isopropanol (CYCAT 4040 commercially available from CYTEK Industries, Inc.). These weight percentages were based upon the total weight, in grams, of the resin solids in the pigmented topcoat.

After these components were combined, the blend was diluted with about 50 grams of a diluent component consisting of: 20 grams of a dibasic ester, 15 grams of isophorone, and 15 grams of an acetate ester. To this diluted mixture was then added about 85 grams of a white pigment component consisting essentially of titanium dioxide, and about 5 grams of conventional additives (e.g., flatting and flow control agents). Hereinafter, the resulting topcoat is referred to as Topcoat P. The total solids concentration of Topcoat P was about 60 weight percent.

Example 10
Testing Results

This examples provides the testing results of coating systems which employ various combinations of the above primers and topcoats. The properties tested were: cure response (before and after overbake), UV resistance, and various physical properties.

Cure Response

Primer C, Primer P, Primer P/AE, Primer P/CE, and Primer P/SCE were each separately applied to a series of 0.024 inch thick, line treated steel panels. Primer C, Primer P, Primer P/AE, Primer P/CE, and Primer P/SCE were also each separately applied to a series of 0.024 inch thick, hot-dipped galvanized steel panels. In both instances, the coatings were applied with a wet film wire-wound applicator, so as to result with a dry film thickness of about 5 microns. Then after the coatings were applied, they were cured at about 215° C. peak metal temperature in a gas-fired convection oven for about 30 seconds. Overbake of the coated panels was achieved with three additional cure bakes, each at about 250° C. peak metal temperature for about 30 seconds.

Cure response was determined by rubbing the coated steel panels with a methyl ethyl ketone (MEK)-soaked cheesecloth with medium pressure. A forward and backward motion counted as one "double rub."

| PRIMER | MEK Double Rubs (After 1st Bake) | MEK Double Rubs (After 4 Bakes) |
| --- | --- | --- |
| Primer C | 25/65 | 10/90 |
| Primer P | 10/8 | 5/3 |
| Primer P/AE | 20/9 | 13/9 |
| Primer P/CE | 13/16 | 17/10 |
| Primer P/SCE | 24/9 | 23/6 |

Coating systems which included Primer C (clear) had good physical properties. On the other hand, the cure response of coating systems which included Primer P (pigmented) dropped after overbake. However, when coating systems included Primer P/AE, Primer P/CE and Primer P/SCE (primers which had a phosphatized epoxy component) good cure response was maintained, even after overbake.

UV Resistance

Two sets of steel panels primed with Primer P, Primer P/AE, Primer P/CE, and Primer P/SCE were prepared as above, except that they were not overbaked. The first set was applied over 0.024 inch thick, line treated steel panels; and the second set was applied over 0.024 inch thick, hot-dipped galvanized steel panels. Topcoat C was then applied to each set of the primed steel panels with a wet film wire-wound applicator, so that the topcoat had a dry film thickness of about 20 microns. Thereafter, the topcoated panels were cured at about 250° C. peak metal temperature in a gas-fired convection oven for about 30 seconds.

In order to test for UV resistance, the topcoated panels were placed in a QUV-B cabinet, subjected to 8 hours of a dry cycle exposure and 4 hours of a wet condensation cycle exposure. This cycling continued for 5,000 hours, or until the coatings failed. This accelerated test was severe so as to simulate situations where the primer is under a low opacity topcoat. After each 500 hours of exposure, the panels were removed from the QUV-B cabinet and taped with 3M Scotch-brand #610 tape. Then, the tape was removed. Failure is indicated by delamination of topcoat and/or primer with the removal of the tape.

For the coating systems applied over the line-treated steel panels, they all passed after 5,000 hours in the QUV cabinet. On the other hand, for the coating systems applied over the hot-dipped galvanized steel panels, the results were as follows:

| COATING SYSTEM | DELAMINATION |
|---|---|
| Primer P with Topcoat C | Failed @ 3,000 Hrs. |
| Primer P/AE with Topcoat C | Failed @ 2,500 Hrs. |
| Primer P/CE with Topcoat C | Failed @ 1,500 Hrs. |
| Primer P/SCE with Topcoat C | Failed @ 3,000 Hrs. |

Physical Properties

Steel panels primed with Primer P/SCE were prepared as above, except that the dry film thickness of the primer films was about 10 microns, the primed panels were cured at about 235° C. peak metal temperature in a gas-fired convection oven for about 45 seconds, and they were not overbaked. The panels employed were 0.002 inch thick cold-rolled steel panels.

Topcoat P was then applied over the primed panels at a dry film thickness of about 20 microns. Thereafter, the film was cured at about 235° C. peak metal temperature in a gas-fired convection oven for about 45 seconds. The observed results of various physical properties tests are set out below:

| MEK | Pencil | T-Bends | | Reverse Impact 160 |
|---|---|---|---|---|
| (Double Rubs) | Hardness | No Pick Off | No Crack | No Pick Off |
| 100+/100+ | H/H | 0T/0T | 2T/3T | Pass/Pass |
| 100+/100+ | H/H | 0T/0T | 2T/4T | Pass/Pass |
| 100+/100+ | H/H | 0T/0T | 2T/3T | Pass/Pass |
| 100+/100+ | 2H/H | 0T/0T | 3T/4T | Pass/Pass |

It is evident from the foregoing that various modifications, which are apparent to those skilled in the art, can be made to the embodiments of this invention without departing from the spirit or scope thereof. Having thus described the invention, it is claimed as follows.

What is claimed is:

1. A coating composition which comprises:
   (a) a polyester-based resin component present in amount ranging from about 50 to about 70 weight percent, said polyester-based component comprising not more than one phosphatized polyester resin having a number average molecular weight ranging from about 3,000 to about 5,000;
   (b) an epoxy component present in amount ranging from about 5 to about 15 weight percent, said epoxy component comprising at least one phosphatized epoxy resin having a number average molecular weight ranging from about 500 to about 5,000;
   (c) a crosslinker component present in amount ranging from about 15 to about 25 weight percent, said crosslinker component comprising the isocyanurate of hexamethylene diisocyanate blocked with 2-butanone oxime;
   (d) a catalyst component present in amount ranging from about 1 to about 5 weight percent, said catalyst component comprising at least one catalyst compound selected from the group consisting of dibutyltindilaurate and dibutyltindiacetate; and
   (e) a diluent component present in amount ranging from about 60 to about 40 weight percent, said diluent component comprising at least one diluent compound selected from the group consisting of aromatic petroleum distillates, methyl ethyl ketone, methyl isobutyl ketone, alcohols, dimethyl phthalate, mono- and dialkyl ethers of ethylene and diethylene glycol;
   said weight percentages for components (a) through (d) are based on the total weight of the resin solids in the resulting coating composition; said weight percentages for component (e) is based on the total weight of the resulting coating composition; and said number average molecular weights for components (a) and (b) measured by gel permeation chromatography using the calibration curve of polystyrene standards.

2. A coating composition which comprises:
   (a) a polyester-based resin component present in amount greater than about 30 weight percent, said polyester-based component comprising not more than one phosphatized polyester resin having a number average molecular weight ranging from about 1,000 to about 20,000;
   (b) an epoxy component present in amount less than about 25 weight percent, said epoxy component comprising at least one phosphatized epoxy resin having a number average molecular weight ranging from about 100 to about 10,000;
   (c) a crosslinker component present in amount less than about 45 weight percent, said crosslinker component comprising at least one polyisocyanate compound;
   (d) a catalyst component present in amount less than about 15 weight percent; and
   (e) a diluent component present in amount less than about 80 weight percent;
   said weight percentages for components (a) through (d) are based on the total weight of the resin solids in the resulting coating composition; said weight percentages for component (e) is based on the total weight of the resulting coating composition; and said number average molecular weights for components (a) and (b) measured by gel permeation chromatography using the calibration curve of polystyrene standards.

3. A coating composition as recited in claim 2 wherein polyester-based resin component present in amount ranging from about 40 to about 80 weight percent.

4. A coating composition as recited in claim 2 wherein the phosphatized polyester resin has a number average molecular weight ranging from about 2,000 to about 10,000.

5. A coating composition as recited in claim 2 wherein the epoxy component is present in amount ranging from about 3 to about 20 weight percent.

6. A coating composition as recited in claim 2 wherein the at least one phosphatized epoxy resin has a number average molecular weight ranging from about 250 to about 7,500.

7. A coating composition as recited in claim 2 wherein the crosslinker component is present in an amount ranging from about 5 to about 45 weight percent.

8. A coating composition as recited in claim 2 wherein the at least one polyisocyanate compound is selected from the group consisting of isocyanurates precursors and isophorone diisocyanates.

9. A coating composition as recited in claim 2 wherein the at least one polyisocyanate compound is the isocyanurate of hexamethylene diisocyanate blocked with 2-butanone oxime.

10. A coating composition as recited in claim 2 wherein the catalyst component is present in an amount ranging from about 0.5 to about 10 weight percent.

11. A coating composition which comprises:
   (a) a polyester-based resin component present in amount ranging from about 50 to about 70 weight percent, said polyester-based component comprising:
      (i) a first phosphatized polyester resin having a number average molecular weight ranging from about 1,500 to about 4,000, and
      (ii) a second phosphatized polyester resin having a number average molecular weight ranging from about 10,000 to about 20,000;
   (b) an epoxy component present in amount ranging from about 5 to about 15 weight percent, said epoxy component comprising at least one phosphatized epoxy resin having a number average molecular ranging from about 500 to about 5,000;
   (c) a crosslinker component present in amount ranging from about 15 to about 25 weight percent, said crosslinker component comprising the isocyanurate of hexamethylene diisocyanate blocked with 2-butanone oxime;
   (d) a catalyst component present in amount ranging from about 1 to about 5 weight percent, said catalyst component comprising at least one catalyst compound selected from the group consisting of dibutyltindilaurate and dibutyltindiacetate; and
   (e) a diluent component present in amount ranging from about 60 to about 40 weight percent, said diluent component comprising at least one diluent compound selected from the group consisting of aromatic petroleum distillates, methyl ethyl ketone, methyl isobutyl ketone, alcohols, dimethyl phthalate, mono- and dialkyl ethers of ethylene and diethylene glycol;
   said weight percentages for components (a) through (d) are based on the total weight of the resin solids in the resulting coating composition; said weight percentages for component (e) is based on the total weight of the resulting coating composition; and said number average molecular weights for components (a) and (b) measured by gel permeation chromatography using the calibration curve of polystyrene standards.

12. A coating composition which comprises:
   (a) a polyester-based resin component in amount greater than about 30 weight percent, said polyester-based component comprising:
      (i) a first phosphatized polyester resin having a number average molecular weight ranging from about 1,000 to about 4,500, and
      (ii) a second phosphatized polyester resin having a number average molecular weight ranging from about 5,000 to about 30,000;
   (b) an epoxy component present in amount less than about 25 weight percent, said epoxy component comprising at least one phosphatized epoxy resin having a number average molecular weight ranging from about 100 to about 10,000;
   (c) a crosslinker component present in amount less than about 45 weight percent, said crosslinker component comprising at least one polyisocyanate compound;
   (d) a catalyst component present in amount less than about 15 weight percent; and
   (e) a diluent component present in amount less than about 80 weight percent;
   said weight percentages for components (a) through (d) are based on the total weight of the resin solids in the resulting coating composition; said weight percentages for component (e) is based on the total weight of the resulting coating composition; and said number average molecular weights for components (a) and (b) measured by gel permeation chromatography using the calibration curve of polystyrene standards.

13. A method of providing a substrate with a multilayer coating system, said method comprising:
   (a) applying at least one layer of a first coating composition onto a substrate, wherein said first coating composition has an elongation of at least about 10 percent as determined with an INSTRON Tester according to ASTM D638-72, said first coating composition comprises:
      (i) a polyester-based resin component present in amount greater than about 30 weight percent, said polyester-based component comprising not more than one phosphatized polyester resin having a number average molecular weight ranging from about 1,000 to about 20,000;
      (ii) an epoxy component present in amount less than about 25 weight percent, said epoxy component comprising at least one phosphatized epoxy resin having a number average molecular weight ranging from about 100 to about 10,000;
      (iii) a crosslinker component present in amount less than about 45 weight percent, said crosslinker component comprising at least one polyisocyanate compound;
      (iv) a catalyst component present in amount less than about 15 weight percent; and
      (v) a diluent component present in amount less than about 80 weight percent;
   said weight percentages for components (i) through (iv) are based on the total weight of the resin solids in the resulting coating composition; said weight percentages for component (v) is based on the total weight of the resulting coating composition; and said number average molecular weights for components (i) and (ii) measured by gel permeation chromatography using the calibration curve of polystyrene standards; and
   (b) applying at least one layer of a second coating composition over the coated substrate of step (a).

14. A method as recited in claim 13 wherein the substrate comprises at least one of the following: cold-rolled steel, hot dip galvanized steel, aluminized steel, and steels clad with zinc/aluminum alloys.

15. A method as recited in claim 13 wherein the at least one layer of a second coating composition comprises a fluorocarbon polymer.

16. A method as recited in claim 15 wherein the at least one layer of a second coating composition comprises a fluorocarbon polymer selected from the group consisting of: polyvinyl fluorides, polyvinylidene fluorides, vinyl fluoride copolymers and vinylidene fluoride copolymers.

17. A method as recited in claim 16 wherein the at least one layer of a second coating composition is pigmented, and wherein said method further comprises applying a clear coating composition over pigmented second coating composition.

18. A method as recited in claim 16 wherein the clear coating composition comprises at least one of the following: fluorocarbon-containing topcoats, polyester containing topcoats, waterborne acrylic containing topcoats and solvent-borne acrylic-containing topcoats.

19. A method as recited in claim 13 wherein the dry film thickness of the first coating composition ranges from about 0.1 mil to about 4 mils, and wherein the dry film thickness of the second coating composition ranges from about 0.1 mil to about 4 mils.

20. A method of providing a substrate with a multilayer coating system, said method comprising:
 (a) applying at least one layer of a first coating composition onto a substrate, wherein said first coating composition has an elongation of at least about 10 percent as determined with an INSTRON Tester according to ASTM D638-72, said first coating composition comprises:
  (i) a polyester-based resin component in amount greater than about 30 weight percent, said polyester-based component comprising:
   a. a first phosphatized polyester resin having a number average molecular weight ranging from about 1,000 to about 4,500, and
   b. a second phosphatized polyester resin having a number average molecular weight ranging from about 5,000 to about 30,000;
  (ii) an epoxy component present in amount less than about 25 weight percent, said epoxy component comprising at least one phosphatized epoxy resin having a number average molecular weight ranging from about 100 to about 10,000;
  (iii) a crosslinker component present in amount less than about 45 weight percent, said crosslinker component comprising at least one polyisocyanate compound;
  (iv) a catalyst component present in amount less than about 15 weight percent; and
  (v) a diluent component present in amount less than about 80 weight percent;
 said weight percentages for components (i) through (iv) are based on the total weight of the resin solids in the resulting coating composition; said weight percentages for component (v) is based on the total weight of the resulting coating composition; and said number average molecular weights for components (i) and (ii) measured by gel permeation chromatography using the calibration curve of polystyrene standards; and
 (b) applying at least one layer of a second coating composition over the coated substrate of step (a).

* * * * *